United States Patent
Hara et al.

(10) Patent No.: US 7,868,584 B2
(45) Date of Patent: Jan. 11, 2011

(54) DC-DC CONVERTER

(75) Inventors: Takashi Hara, Kyoto (JP); Takayoshi Nishiyama, Takatsuki (JP); Koichi Ueki, Takatsuki (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/839,461

(22) Filed: Jul. 20, 2010

(65) Prior Publication Data

US 2010/0277132 A1 Nov. 4, 2010

Related U.S. Application Data

(63) Continuation of application No. PCT/JP2008/068732, filed on Oct. 16, 2008.

(30) Foreign Application Priority Data

Jan. 28, 2008 (JP) ............... 2008-015815

(51) Int. Cl.
*H02J 7/14* (2006.01)
*H02J 7/00* (2006.01)
*H02J 7/16* (2006.01)

(52) U.S. Cl. ................. 320/104; 320/103; 320/128; 320/140

(58) Field of Classification Search ............. 320/104
See application file for complete search history.

(56) References Cited

U.S. PATENT DOCUMENTS

2002/0109407 A1 8/2002 Morimoto et al.
2006/0238168 A1 10/2006 Matsuo et al.
2007/0139975 A1 6/2007 Yamauchi et al.

FOREIGN PATENT DOCUMENTS

| JP | 2-45476 U | 3/1990 |
|----|-----------|--------|
| JP | 9-230010 A | 9/1997 |
| JP | 9-285029 A | 10/1997 |
| JP | 11-8910 A | 1/1999 |
| JP | 11008910 | * 1/1999 |
| JP | 11-204150 A | 7/1999 |

OTHER PUBLICATIONS

Official Communication issued in International Patent Application No. PCT/JP2008/068732, mailed on Jan. 13, 2009.

* cited by examiner

*Primary Examiner*—Edward Tso
*Assistant Examiner*—Ahmed Omar
(74) *Attorney, Agent, or Firm*—Keating & Bennett, LLP

(57) ABSTRACT

A DC-DC converter includes an inductor, a capacitor, an output voltage detection circuit, and a synchronous rectification circuit including a rectifier-side synchronous rectifier element and a commutator-side synchronous rectifier element. The commutator-side synchronous rectifier element is turned on so as to pass a current through a closed loop composed of the commutator-side synchronous rectifier element, the inductor, and a second secondary battery. The characteristic evaluation of the second secondary battery is performed on the basis of the decrease in a detection voltage Vout of an output voltage Vo. As a result, it is possible to determine the effective capacity or characteristic degradation state of the second secondary battery with a circuit to charge the second secondary battery without using a dedicated circuit.

6 Claims, 8 Drawing Sheets

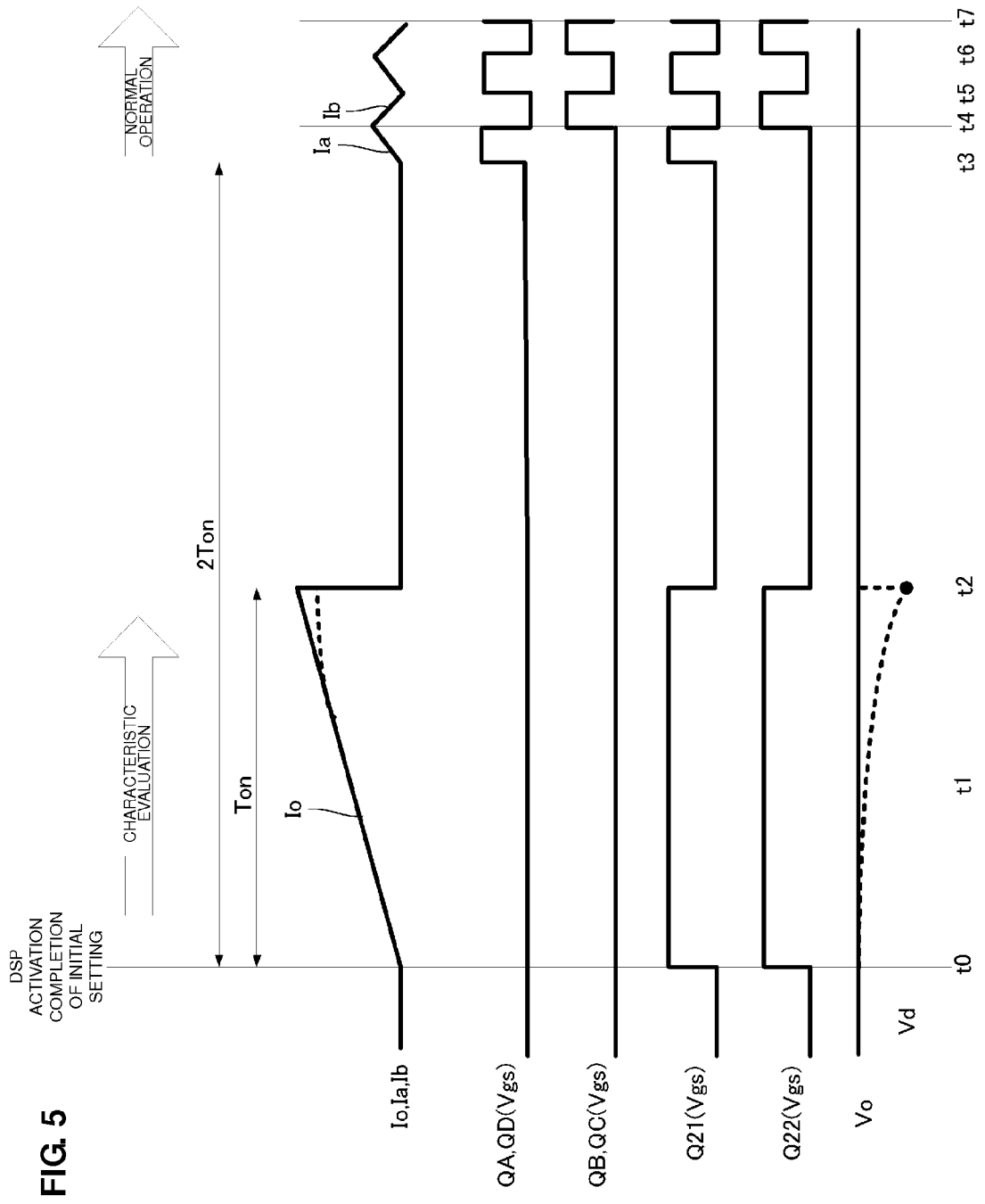

DC-DC CONVERTER

BACKGROUND OF THE INVENTION

1. Field of the Invention

The present invention relates to a DC-DC converter preferably for use in, for example, hybrid vehicles, and that is capable of determining a effective capacity or characteristic degradation state of a 12V lead-acid battery that is the same as that used in gasoline-driven vehicles in the related art.

2. Description of the Related Art

Repeated charging/discharging of secondary batteries degrades the internal physicochemical property of the secondary batteries and reduces the effective capacity of the secondary batteries. When the effective capacity of such a secondary battery decreases to a certain level, it is determined that the secondary battery reaches the end of its useful life. It is necessary to replace the secondary battery.

In order to prevent the full discharging of a lead-acid battery, that is, "battery exhaustion" in vehicles for starting an engine with a starter motor, it is important that the degree of reduction in the effective capacity of the battery is determined.

On the other hand, "hybrid vehicles" having both a gasoline engine and an electric motor are becoming increasing popular. In a region where the number of times of acceleration/deceleration is small and a fuel efficiency is high, for example, on an expressway, such a hybrid vehicle drives a gasoline engine, generates power using an electric motor, and stores the generated power in a secondary battery such as a lithium-ion battery. In a region where the number of times of acceleration/deceleration is large and a fuel efficiency is low, for example, on a general road, the hybrid vehicle travels by driving the electric motor with power supplied from the lithium-ion battery.

In general hybrid vehicles, a lithium-ion battery for supplying power to an electric motor, which allows a vehicle to travel, generates a voltage of approximately 300 V to 400 V. Like gasoline-driven vehicles, such a hybrid vehicle needs to have a lead-acid battery (whose output voltage is 12 V) for driving electric components and starting a gasoline engine.

In gasoline-driven vehicles in the related art, a method is employed of attaching an alternator (generator) to a gasoline engine and charging a lead-acid battery while the gasoline engine runs. In the case of hybrid vehicles, an electric motor is installed in advance and the installation of an alternator is therefore a waste of space. Accordingly, in hybrid vehicles, a method is employed of stepping down a voltage of approximately 300 V to 400 V generated by an electric motor to 12 V with a DC-DC converter and charging a lead-acid battery without an alternator.

However, when "battery exhaustion" of a lead-acid battery occurs, like gasoline-driven vehicles, hybrid vehicles cannot move. Even if a lithium-ion battery tries to start a gasoline engine, it is impossible to start the gasoline engine because a DC-DC converter does not have a current capacity required for driving of a starter motor. Thus, in hybrid vehicles, it is also important that the effective capacity or characteristic degradation state of a lead-acid battery is determined, that is, it is determined whether the lead-acid battery is at the end of its useful life or when the lead-acid battery reaches the end of its useful life.

Japanese Unexamined Utility Model Application Publication No. 2-45476 discloses an apparatus for measuring the effective capacity of a battery. The apparatus disclosed in Japanese Unexamined Utility Model Application Publication No. 2-45476 will be described with reference to FIG. 1. The apparatus includes a microcomputer 1, a charger 3 for charging a secondary battery 2, an A/D converter 4, a constant current load 5, a display device 7, a condition setting unit 6, and an external apparatus 8. The secondary battery 2 is connected to the charger 3 via a switch 10, and is connected to the constant current load 5 via a switch 11. The A/D converter 4 and the constant current load 5 are used to measure the discharging characteristic of the secondary battery 2 after charging has been completed. At the time of measuring the discharging characteristic, a constant current load is controlled in response to an instruction for a load current value transmitted from the microcomputer 1, the switch 11 is turned on, and the constant current load 5 is connected to the secondary battery 2. At that time, the switch 10 connected to the charger 3 is turned off.

Thus, a current of a predetermined value is passed through a load connected to a battery, and the fall time of a voltage across the battery (a time required for the voltage across the battery to decrease to a predetermined threshold voltage) is measured.

As disclosed in Japanese Unexamined Utility Model Application Publication No. 2-45476, in an apparatus in the related art for measuring the effective capacity of a secondary battery, it is necessary to provide a measurement circuit in addition to a charging circuit. This requires space and cost.

SUMMARY OF THE INVENTION

In view of the above, preferred embodiments of the present invention provide a DC-DC converter that is capable of determining an effective capacity or characteristic degradation state of a secondary battery with a circuit for charging the secondary battery without providing a dedicated circuit.

A preferred embodiment of the present invention provides a DC-DC converter that converts a voltage of an input power source connected to an input terminal thereof and charges a secondary battery connected to an output terminal thereof. The DC-DC converter includes a synchronous rectification circuit including a rectifier-side synchronous rectifier element and a commutator-side synchronous rectifier element; an inductor configured to store electric energy when the rectifier-side synchronous rectifier element is in an ON state and the commutator-side synchronous rectifier element is in an OFF state and release the stored electric energy when the rectifier-side synchronous rectifier element is in the OFF state and the commutator-side synchronous rectifier element is in the ON state; a capacitor configured to smooth a voltage rectified by the synchronous rectification circuit; an output voltage detection circuit configured to detect an output voltage of the output terminal; and a characteristic evaluating unit arranged to pass a current through a closed loop including the commutator-side synchronous rectifier element, the inductor, and the secondary battery by turning on the commutator-side synchronous rectifier element when the DC-DC converter is in a non-operation state and determining an effective capacity or a characteristic degradation state of the secondary battery on the basis of a decrease in a voltage detected by the output voltage detection circuit at the time of passage of the current through the closed loop or a slope of the decrease in the voltage.

It is possible to determine the effective capacity or characteristic degradation state of a secondary battery with the above-described DC-DC converter required for charging of the secondary battery without using another dedicated circuit.

In the case of an isolated DC-DC converter, since a discharging current flows through a rectifier-side synchronous rectifier element when the rectifier-side synchronous rectifier element is turned on, the rectifier-side synchronous rectifier element may be turned on along with a commutator-side synchronous rectifier element.

A preferred embodiment of the DC-DC converter may further include an alerting device arranged to notify, when the characteristic evaluating unit detects that the secondary battery reaches an end of its useful life, a user of a result of the detection. As a result, it is possible to replace the secondary battery at an appropriate time and therefore prevent the problem of battery exhaustion.

A switching element to be turned off at the time of evaluation performed by the characteristic evaluating unit may preferably be connected in series to the capacitor. As a result, it is possible to prevent the resonance operation of the inductor or the inductance component of a line and the capacitor and therefore prevent the application of an overvoltage to the rectifier-side synchronous rectifier element or the commutator-side synchronous rectifier element.

The DC-DC converter may preferably further include an overcurrent breaker (for example, a fuse) disposed between the output terminal of the DC-DC converter and the secondary battery; and a detector arranged to detect a state of the overcurrent breaker by detecting a fact that no current passes through the closed loop at the time of evaluation performed by the characteristic evaluating unit.

As a result, when it is determined that no current flows at the time of determination of the effective capacity or characteristic degradation state of the secondary battery, it is also possible to detect the state of the overcurrent breaker.

The characteristic evaluating unit determines the effective capacity or characteristic degradation state of the secondary battery within a predetermined period of time, for example, before a converter operation is started. As a result, since evaluation processing can be performed before the charging of the secondary battery is started, it is possible to more accurately determine the effective capacity or characteristic degradation state of the secondary battery. Furthermore, since the original function of a DC-DC converter of charging a secondary battery is not inhibited, the charging performance of a secondary battery is not reduced.

The input power source preferably is another secondary battery that is charged by, for example, a generator and has an output voltage higher than that of the secondary battery.

As a result, a preferred embodiment of the present invention can be applied to an apparatus that includes a high-voltage and large-capacity lithium-ion battery and a lead-acid battery used to drive of a starter motor to start a gasoline engine and charges the lead-acid battery with a DC-DC converter, for example, to a hybrid vehicle without adding a special circuit to the apparatus.

According to a preferred embodiment of the present invention, it is possible to determine the effective capacity or characteristic degradation state of a secondary battery without using a special dedicated circuit by effectively using a DC-DC converter required for charging of the secondary battery. This can prevent the increase in space and cost and a problem caused by the decrease in the effective capacity of a secondary battery.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a waveform diagram illustrating the state of each component in a period from the activation of a switching control circuit in a DC-DC converter according to the first preferred embodiment of the present invention to the normal operation.

DETAILED DESCRIPTION OF THE PREFERRED EMBODIMENTS

First Preferred Embodiment

Figure 1:
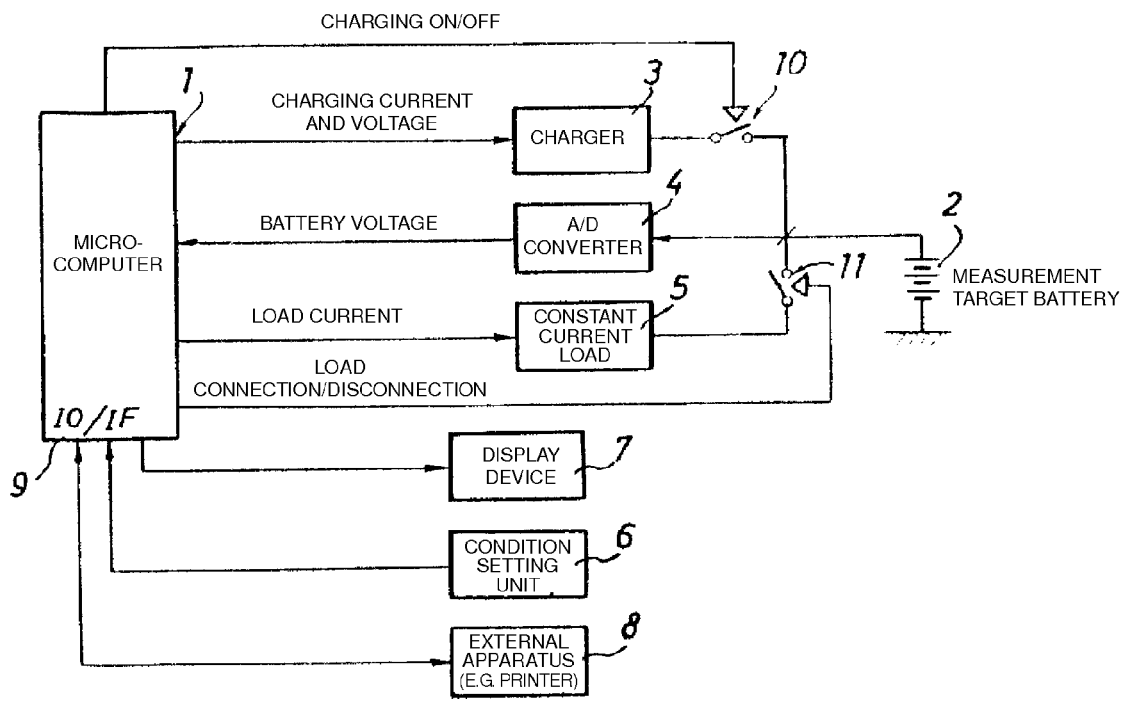
FIG. 1 is a diagram illustrating the configuration of an apparatus for measuring the capacity limit of a secondary battery disclosed in Japanese Unexamined Utility Model Application Publication No. 2-45476.
Figure 2:
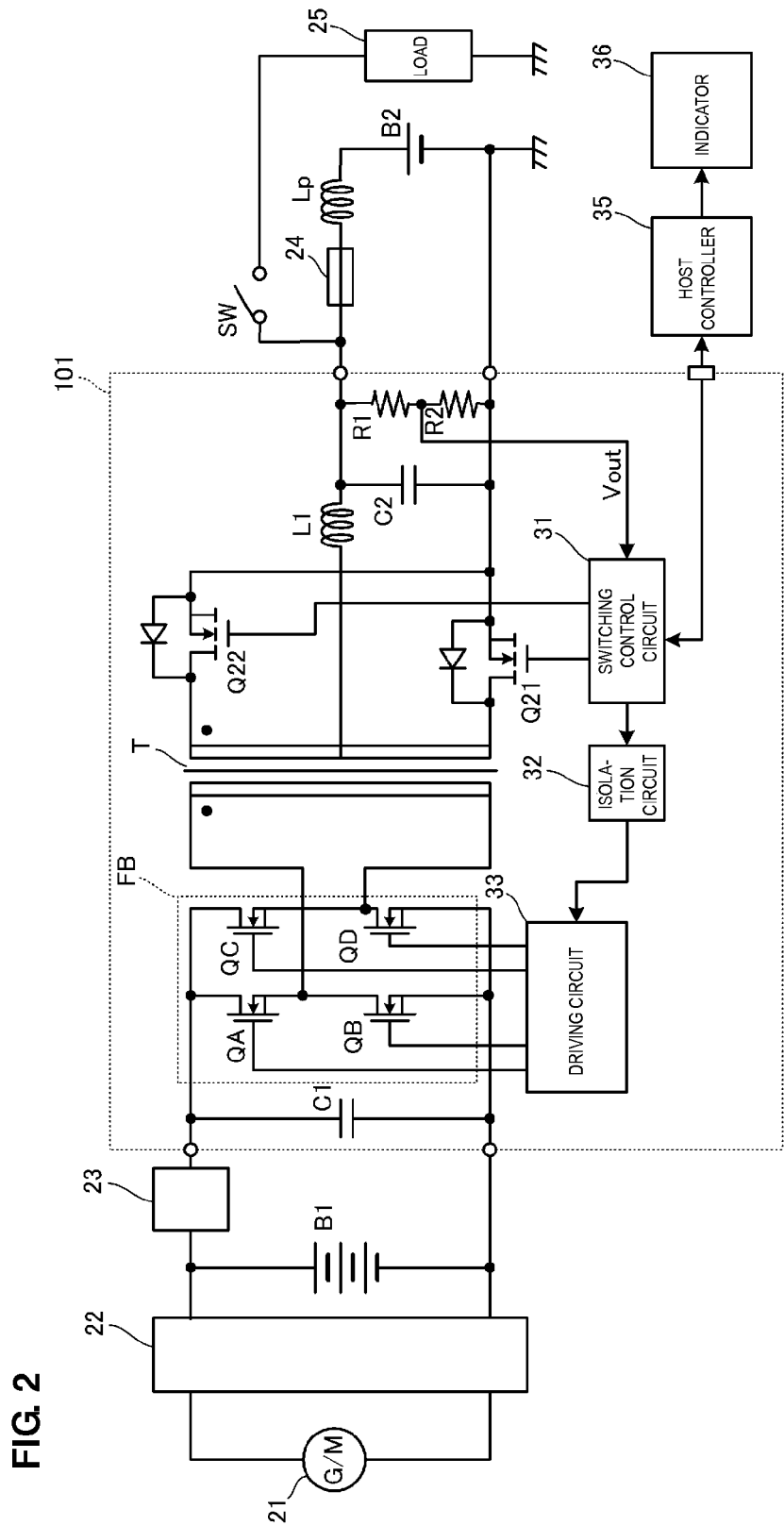
FIG. 2 is a circuit diagram illustrating the circuit configuration of a DC-DC converter according to a first preferred embodiment of the present invention and a peripheral circuit.

FIG. 2 is a circuit diagram illustrating the circuit configuration of a DC-DC converter according to the first preferred embodiment of the present invention and a peripheral circuit. The illustrated circuit is a charging/discharging circuit for a hybrid vehicle, and includes the electric motor (generator) 21, a first secondary battery B1, and a second secondary battery B2.

The electric motor 21 functions as a generator while a hybrid vehicle travels with a gasoline engine, and functions as an electric motor while the hybrid vehicle is driven by a lithium-ion battery.

A charging/discharging control circuit 22 is disposed between the electric motor (generator) 21 and the first secondary battery B1. A switching circuit 23 is disposed between the first secondary battery B1 and the input portion of a DC-DC converter 101. The output portion of the DC-DC converter 101 is connected to the second secondary battery B2 via a fuse 24. An inductance of a line between the output portion of the DC-DC converter 101 and the second secondary battery B2 is represented as a parasitic inductor Lp. A load (various electric components) 25 is connected to the second secondary battery B2 and the DC-DC converter 101 via a switch SW.

Thus, the DC-DC converter 101 converts the voltage of an input power supply connected to an input terminal thereof and charges the second secondary battery B2 connected to an output terminal thereof.

A host controller 35 is connected to the DC-DC converter 101. The host controller 35 controls various control circuits and displays pieces of information indicating various conditions on an indicator 36. For example, the host controller 35 displays the effective capacity of the second secondary battery B2 or information indicating whether the second secondary battery B2 reaches the end of its useful life.

The DC-DC converter 101 is provided with a transformer T. On the primary side of the transformer T, a switching circuit FB including four switching elements QA, QB, QC, and QD and a smoothing capacitor C1 are disposed. On the secondary side of the transformer T, a synchronous rectification circuit including a rectifier-side synchronous rectifier element Q21, a commutator-side synchronous rectifier element Q22, an inductor L1, and a capacitor C2 is disposed. Between output terminals of the DC-DC converter 101, an output voltage detection circuit including resistors R1 and R2 is disposed.

A switching control circuit 31 outputs a control signal to a driving circuit 33 via an isolation circuit 32 that is, for example, a pulse transformer. The driving circuit 33 drives the switching circuit FB including the four switching elements QA, QB, QC, and QD at a predetermined on-duty ratio. Furthermore, the switching control circuit 31 performs synchronous rectification by turning on/off the rectifier-side synchronous rectifier element Q21 and the commutator-side synchronous rectifier element Q22 in synchronization with the driving time of the switching circuit FB. Still furthermore, the switching control circuit 31 receives a detection voltage Vout of an output voltage and controls the on-duty ratio of the switching circuit FB so as to stabilize the output voltage of the DC-DC converter 101.

Figure 3A:
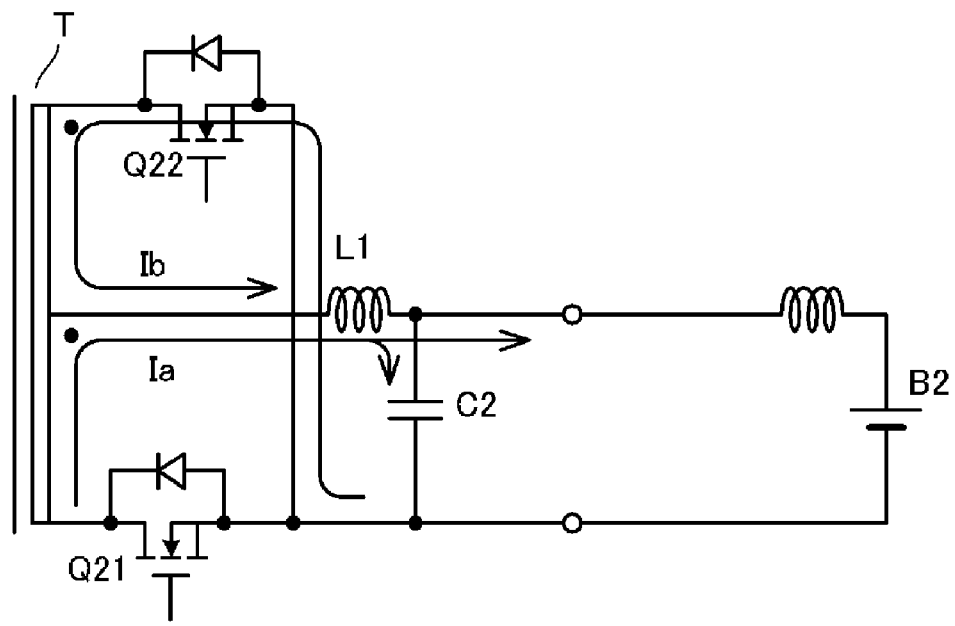
FIGS. 3A and 3B are diagrams illustrating current paths obtained at the time of the normal operation of the DC-DC converter and characteristic evaluation performed by the DC-DC converter.
Figure 3B:
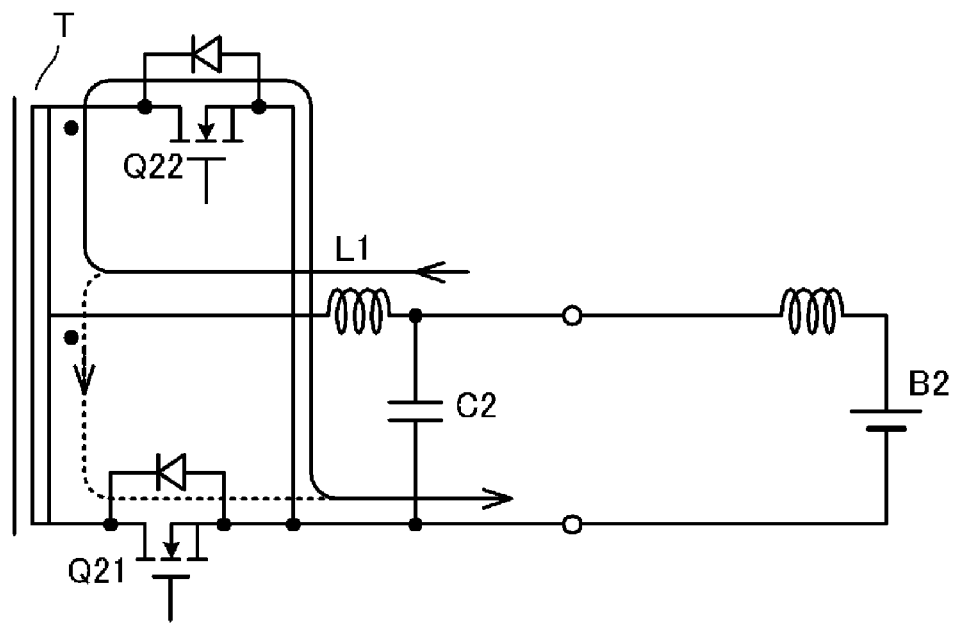

FIGS. 3A and 3B are diagrams illustrating a current path obtained at the time of the normal operation of the DC-DC converter 101 (the charging of the second secondary battery B2) and a current path obtained at the time of the measurement of the effective capacity of the second secondary battery B2 or the detection of the characteristic degradation state of the second secondary battery B2 (hereinafter referred to as characteristic evaluation). In the drawings, only a main portion on the secondary side of the transformer T is illustrated.

At the time of the normal operation, as illustrated in FIG. 3A, the rectifier-side synchronous rectifier element Q21 is turned on in synchronization with turning-on of the switching elements QA and QD on the primary side of the transformer T. In this state, a current Ia flows in accordance with an induced voltage in the secondary winding of the transformer T. Electric energy is stored in the inductor L1 in accordance with the current Ia.

Subsequently, the rectifier-side synchronous rectifier element Q21 is turned off and the commutator-side synchronous rectifier element Q22 is turned on in synchronization with turning-off of the switching elements QA and QD and turning-on of the switching elements QB and QC, and a current Ib flows when the energy stored in the inductor L1 is released. By repeating this process, synchronous rectification is performed.

On the other hand, at the time of the characteristic evaluation of the second secondary battery B2, the commutator-side synchronous rectifier element Q22 is turned on in a state in which all of the switching elements QA to QD on the primary side of the transformer T remain off. Subsequently, a current Io flows on a path illustrated in FIG. 3B, and a discharging path for the second secondary battery B2 is generated. At that time, the rectifier-side synchronous rectifier element Q21 may also be turned on. In this case, a current flows on a path represented by a broken line illustrated in FIG. 3B.

A characteristic evaluation method performed at the time of the above-described characteristic evaluation is as follows. FIG. 4B illustrates the relationship between the discharging current Io of the second secondary battery B2 and an output voltage (the terminal voltage of the second secondary battery B2) Vo. When the second secondary battery has a rated effective capacity, an internal resistance is increased and the output voltage is reduced with the increase in the discharging current (discharge rate) as represented by a characteristic curve S1. When the characteristic degradation of the second secondary battery proceeds and the effective capacity of the second secondary battery is reduced, the output voltage is further reduced even if the discharging current is relatively small (the discharge rate is low) as represented by a characteristic curve S2.

Figure 4A:
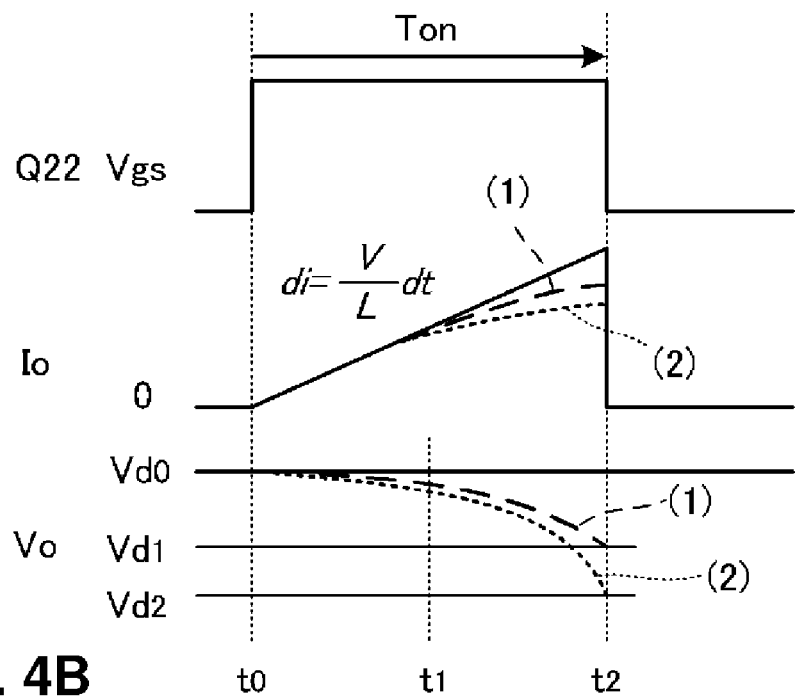
FIGS. 4A and 4B are diagrams describing an operation for performing the characteristic evaluation of a secondary battery.
Figure 4B:
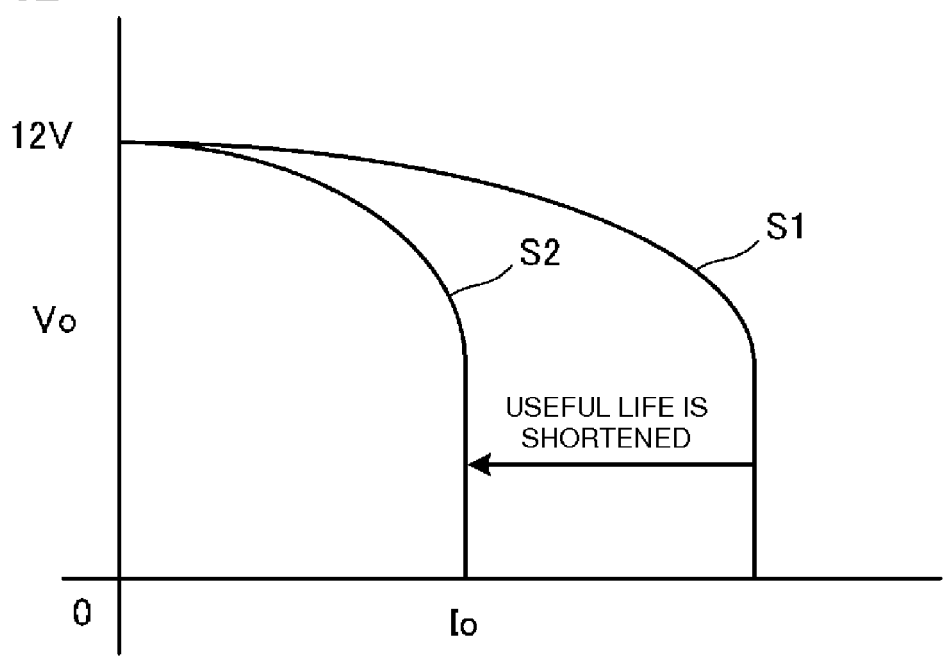

Accordingly, as illustrated in FIG. 4A, the slope of the discharging current Io of the second secondary battery B2 which flows in synchronization with turning-on of the commutator-side synchronous rectifier element Q22 is determined by the inductances of the inductor L1 and the parasitic inductor Lp illustrated in FIGS. 2, 3A, and 3B and the output voltage Vo of the second secondary battery B2. However, since the output voltage Vo is reduced in a period (Ton) when the commutator-side synchronous rectifier element Q22 is in the ON state, the current Io is not significantly changed. The output voltage Vo decreases in accordance with the change in the current Io.

In FIG. 4A, (1) represents the changes in the current Io and the output voltage Vo when the effective capacity of the second secondary battery is large, and (2) represents the changes in the current Io and the output voltage Vo when the effective capacity of the second secondary battery is small. In a case in which the effective capacity of the second secondary battery is large, a voltage Vd1 is obtained after the period Ton has elapsed from a time t0 at which the commutator-side synchronous rectifier element Q22 is turned on (at a time t2). In a case in which the effective capacity of the second secondary battery is small, a voltage Vd2 is obtained after the period Ton has elapsed from the time t0 (at the time t2).

Accordingly, the effective capacity is evaluated by determining a voltage drop after the period Ton has elapsed from the time t0 at which the commutator-side synchronous rectifier element Q22 is turned on. The voltage drop (Vd0-Vd1) is small when the effective capacity is large. The voltage drop (Vd0-Vd2) is large when the effective capacity is small. Thus, since there is a correlation between the voltage drop and the effective capacity, the effective capacity is calculated using the voltage drop. Alternatively, when the voltage drop exceeds a predetermined value, it is determined that the second secondary battery B2 reaches the end of its useful life and an alert is generated.

As another evaluation method using the correlation between the voltage drop and the effective capacity, a method may be employed of performing the characteristic evaluation on the basis of the slope of the output voltage Vo obtained in a predetermined period in which the commutator-side synchronous rectifier element Q22 is in the ON state. For example, as the simplest method, a method is employed of calculating the difference between the output voltage at a time t1 that is the middle of the period Ton during which the commutator-side synchronous rectifier element Q22 is in the ON state and the output voltage at the time t2 that is the end of the period Ton as the slope of a curve representing the change in the output voltage. The characteristic evaluation is performed on the basis of the fact that the slope of the curve becomes steep when the effective capacity of the second secondary battery B2 is small or the characteristic degradation of the second secondary battery B2 proceeds.

The switching control circuit 31 illustrated in FIG. 2 may output the detection voltage Vout (the proportional voltage of the output voltage Vo of the second secondary battery B2) obtained by the output terminal voltage detection circuit including the resistors R1 and R2 to the host controller 35, and the host controller 35 may perform the characteristic evaluation. When the switching control circuit 31 includes a DSP, the switching control circuit 31 performs A/D conversion therein, performs the characteristic evaluation by digital computation, and outputs a result of the characteristic evaluation to the host controller 35.

When the blowout of the fuse 24 illustrated in FIG. 2 occurs, the discharging current Io does not flow and the drop in the output voltage Vo does not occur. On the basis of this state, it is possible to detect the blowout of the fuse 24. The characteristic evaluation may be performed with determination program. Instead of the fuse, any component that is an overcurrent breaker may be used.

FIG. 5 is a waveform diagram illustrating the state of each component in a period from the activation of the switching control circuit 31 illustrated in FIG. 2 to the normal operation. It is assumed that the switching control circuit 31 includes a DSP. When the switching circuit 23 illustrated in FIG. 2 is brought into conduction, the switching control circuit 31 is activated by an auxiliary power supply (not illustrated) and performs the initial setting of the DSP.

Subsequently, the commutator-side synchronous rectifier element Q22 is turned on. In this example, the rectifier-side synchronous rectifier element Q21 is also turned on. As a result, the discharging current Io flows. The period Ton in which the commutator-side synchronous rectifier element Q22 (and the rectifier-side synchronous rectifier element Q21) is in the ON state is calculated as follows: Ton=Imax× L/V where Imax denotes the maximum current, L denotes the combined inductance of the inductor L1 and the parasitic inductor Lp illustrated in FIG. 2, and V denotes the rated output voltage of the second secondary battery B2.

In the case of lead-acid batteries installed in hybrid vehicles, Imax is, for example, about 150 A and the period Ton is on the order of several milliseconds to several tens of milliseconds. That is, in the case of electric vehicles, V approximately 12 V, di=approximately 150 A, and L=approximately 3 μH in the mathematical expression of V=L×di/dt. When the output inductance of a converter is several microhenries (the parasitic inductance to a battery is between several hundreds of picohenries and several microhenries), dt is on the order of several milliseconds to several tens of milliseconds.

Thus, when the period Ton required for the characteristic evaluation is short, a driver does not notice the delay time of starting an engine corresponding to a time required for the characteristic evaluation.

The characteristic evaluation is completed within the period Ton (at the time t2). However, since control processing performed after the characteristic evaluation is changed in accordance with a result of the characteristic evaluation, the normal operation starts at a time t3 or later after a period of 2 Ton has elapsed.

In the normal operation, the switching elements QA and QD and the rectifier-side synchronous rectifier element Q21 are turned on in a period between the time t3 and a time t4. As a result, the current Ia (see FIG. 3A) flows. Subsequently, in a period between the time t4 and a time t5, the switching elements QA and QD and the rectifier-side synchronous rectifier element Q21 are turned off, and the switching elements QB and QC and the commutator-side synchronous rectifier element Q22 are turned on. As a result, the current Ib (see FIG. 3A) flows. An operation similar to this operation is repeated. Consequently, the second secondary battery B2 is charged with a generated voltage.

Second Preferred Embodiment

Figure 6:
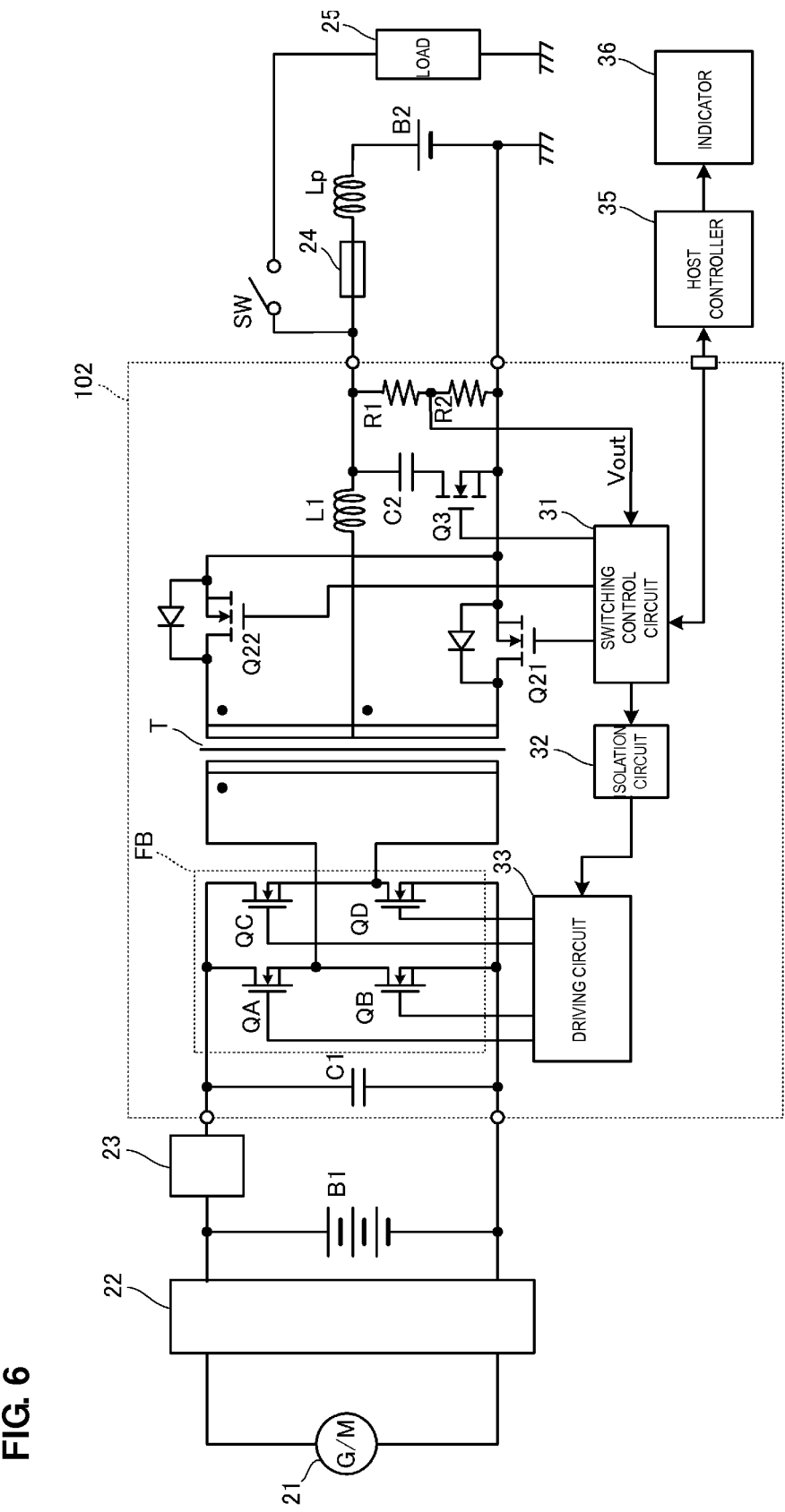
FIG. 6 is a circuit diagram illustrating the circuit configuration of a DC-DC converter according to a second preferred embodiment of the present invention and a peripheral circuit.

FIG. 6 is a circuit diagram illustrating the circuit configuration of a DC-DC converter according to the second preferred embodiment and a peripheral circuit. A DC-DC converter 102 according to the second preferred embodiment differs from the DC-DC converter 101 according to the first preferred embodiment illustrated in FIG. 2 in that a switching element Q3 is connected in series to the capacitor C2. The switching control circuit 31 is turned off only when the characteristic evaluation of the second secondary battery B2 is performed, and is in the ON state at the time of the normal driving. Except for the switching element Q3, the configuration of the DC-DC converter 102 is the same as that illustrated in FIG. 2.

Thus, by blocking the path of a current passing through the capacitor C2 using the switching element Q3 only at the time of the characteristic evaluation, the LC resonance operation of the inductor L1 or the parasitic inductor Lp and the capacitor C2 is prohibited. That is, when the commutator-side synchronous rectifier element Q22 is turned on at the time of the characteristic evaluation without the switching element Q3, an overvoltage may be generated by the LC resonance operation. The overvoltage may destroy the rectifier-side synchronous rectifier element Q21 and the commutator-side synchronous rectifier element Q22. By disposing the switching element Q3, it is possible to prevent this state and eliminate the need for using the rectifier-side synchronous rectifier element Q21 and the commutator-side synchronous rectifier element Q22 which have a high resistance to pressure.

Third Preferred Embodiment

Figure 7:
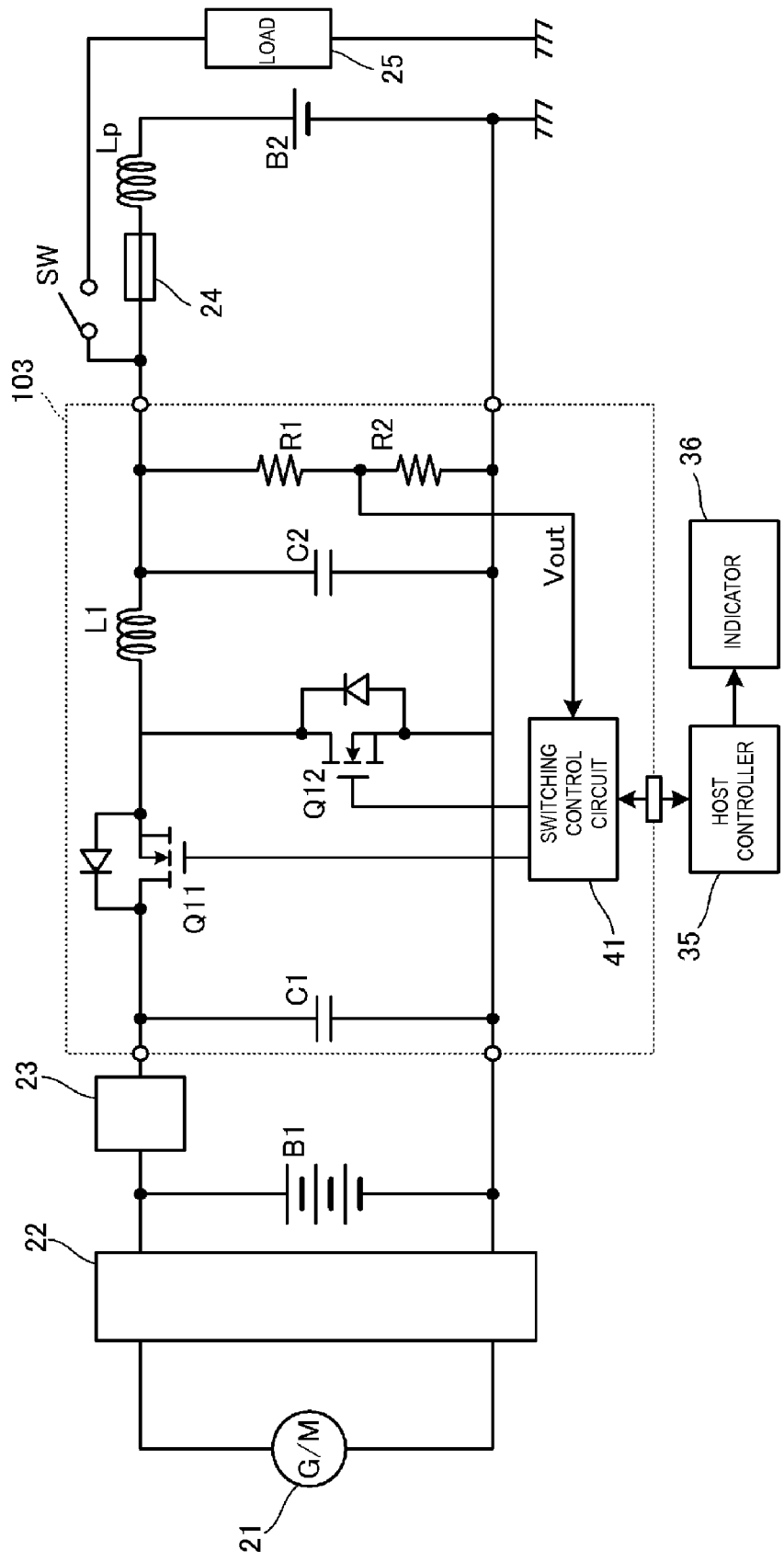
FIG. 7 is a circuit diagram illustrating the circuit configuration of a DC-DC converter according to a third preferred embodiment of the present invention and a peripheral circuit.

Exemplary isolated DC-DC converters have been described in the first and second preferred embodiments. In the third preferred embodiment, an exemplary non-isolated DC-DC converter will be described. FIG. 7 is a circuit diagram illustrating the circuit configuration of a DC-DC converter according to the third preferred embodiment and a peripheral circuit. The configuration illustrated in FIG. 7 is the same as that described in the first and second preferred embodiments except for a DC-DC converter 103. The DC-DC converter 103 includes a rectifier-side synchronous rectifier element Q11, a commutator-side synchronous rectifier element Q12, the inductor L1, and the capacitor C2 which define a synchronous rectification circuit. The DC-DC converter 103 includes the smoothing capacitor C1 on the side of the input portion thereof and an output voltage detection circuit including the resistors R1 and R2 on the side of the output portion thereof.

A switching control circuit 41 performs synchronous rectification by controlling the rectifier-side synchronous rectifier element Q11 and the commutator-side synchronous rectifier element Q12. Furthermore, the switching control circuit 41 compares the detection voltage Vout of an output terminal voltage with a reference voltage, and controls the on-duty ratio of the rectifier-side synchronous rectifier element Q11 so that the output voltage of the DC-DC converter 103 becomes a predetermined voltage. Still furthermore, the switching control circuit 41 performs the characteristic evaluation of the second secondary battery B2 and outputs a result of the characteristic evaluation to the host controller 35.

When the characteristic evaluation of the second secondary battery B2 is performed with the non-isolated DC-DC converter 103 illustrated in FIG. 7, the commutator-side synchronous rectifier element Q12 is turned on without turning on the rectifier-side synchronous rectifier element Q11 at the time of activation of the DC-DC converter 103. As a result, the discharging current Io flows. On the basis of the detection voltage Vout of an output terminal voltage, the characteristic evaluation is performed using a method similar to that described in the first preferred embodiment.

Fourth Preferred Embodiment

Figure 8:
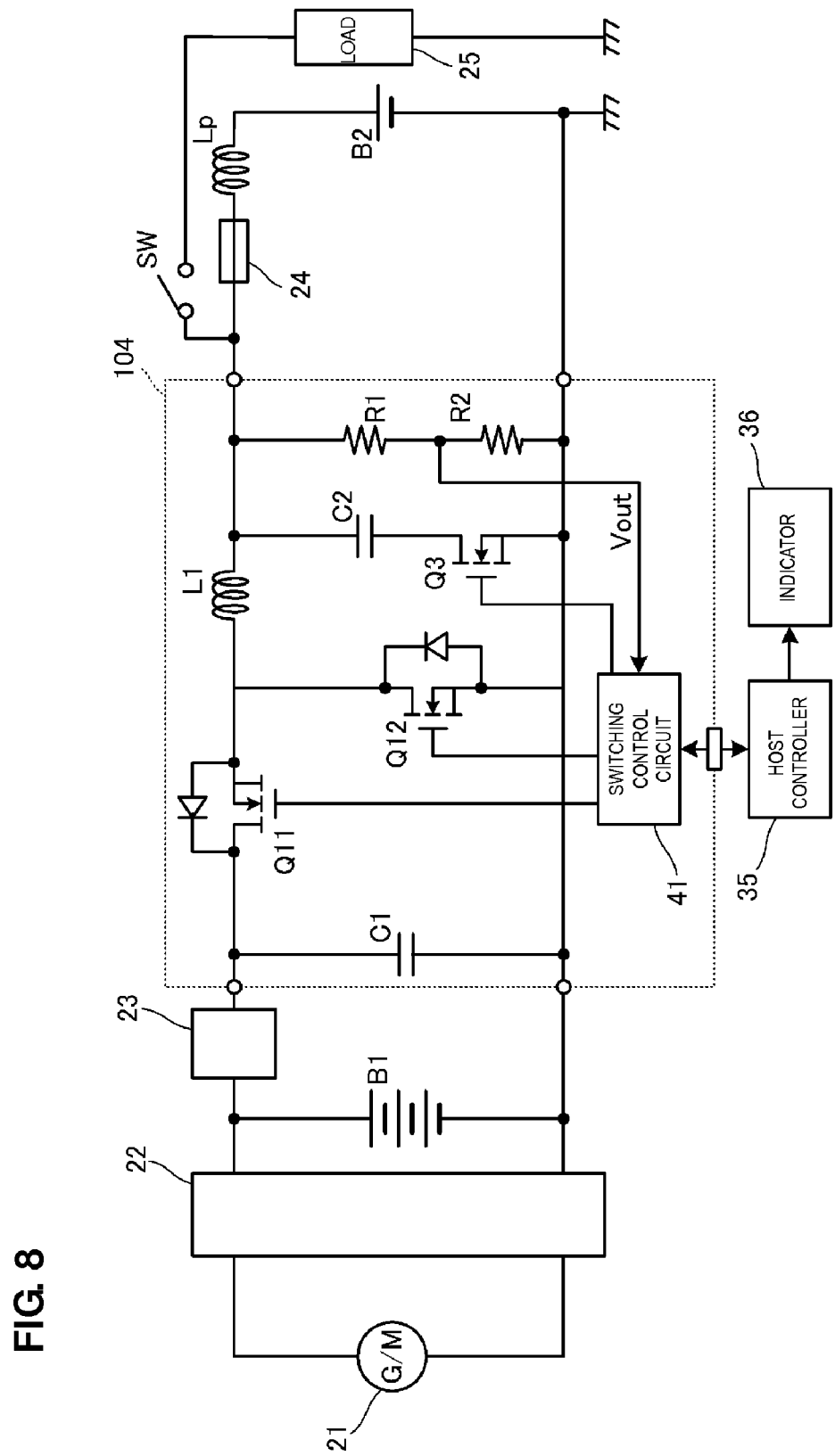
FIG. 8 is a circuit diagram illustrating the circuit configuration of a DC-DC converter according to a fourth preferred embodiment of the present invention and a peripheral circuit.

FIG. 8 is a circuit diagram illustrating the circuit configuration of a DC-DC converter according to the fourth preferred embodiment and a peripheral circuit. The configuration of a DC-DC converter 104 illustrated in FIG. 8 differs from the configuration of the DC-DC converter 103 illustrated in FIG. 7 in that the switching element Q3 is connected in series to the capacitor C2. The switching control circuit 41 is turned off only when the characteristic evaluation of the second secondary battery B2 is performed and is in the ON state at the time of the normal operation.

By blocking the path of a current passing through the capacitor C2 using the switching element Q3 only when the characteristic evaluation is performed, the LC resonance operation of the capacitor C2 and the inductor L1 or the parasitic inductor Lp is prohibited. Accordingly, it is possible to prevent the commutator-side synchronous rectifier element Q12 or the rectifier-side synchronous rectifier element Q11 from being destroyed by an overvoltage caused by the LC resonance operation.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A DC-DC converter operative to convert a voltage of an input power source connected to an input terminal thereof and charging a secondary battery connected to an output terminal thereof, comprising:
   a synchronous rectification circuit including a rectifier-side synchronous rectifier element and a commutator-side synchronous rectifier element;
   an inductor configured to store electric energy when the rectifier-side synchronous rectifier element is in an ON state and the commutator-side synchronous rectifier element is in an OFF state and to release stored electric energy when the rectifier-side synchronous rectifier element is in the OFF state and the commutator-side synchronous rectifier element is in the ON state;
   a capacitor configured to smooth a voltage rectified by the synchronous rectification circuit;
   an output voltage detection circuit configured to detect an output voltage of the output terminal; and
   a characteristic evaluating unit arranged to pass a current through a closed loop including the commutator-side synchronous rectifier element, the inductor, and the secondary battery by turning on the commutator-side synchronous rectifier element when the DC-DC converter is in a non-operation state and determining an effective capacity or a characteristic degradation state of the secondary battery on the basis of a decrease in a voltage detected by the output voltage detection circuit at the time of passage of the current through the closed loop or a slope of the decrease in the voltage.

2. The DC-DC converter according to claim 1, further comprising an alerting device arrange to notify a user, when the characteristic evaluating unit detects that the secondary battery reaches an end of its useful life, of a result of the detection.

3. The DC-DC converter according to claim 1, wherein a switching element to be turned off at the time of evaluation performed by the characteristic evaluating unit is connected in series to the capacitor.

4. The DC-DC converter according to claim 1, further comprising:
   an overcurrent breaker disposed between the output terminal of the DC-DC converter and the secondary battery; and
   a detector arrange to detect a state of the overcurrent breaker by detecting a fact that no current passes through the closed loop at the time of evaluation performed by the characteristic evaluating unit.

5. The DC-DC converter according to claim 1, wherein the characteristic evaluating unit is arranged to determine the effective capacity or characteristic degradation state of the secondary battery within a predetermined period of time before a converter operation is started.

6. The DC-DC converter according to claim 1, wherein the input power source is another secondary battery that is charged by a generator and has an output voltage higher than that of the secondary battery.

* * * * *